Oct. 29, 1957     C. E. MEYERHOEFER     2,810,925
CASTER
Original Filed Nov. 24, 1954
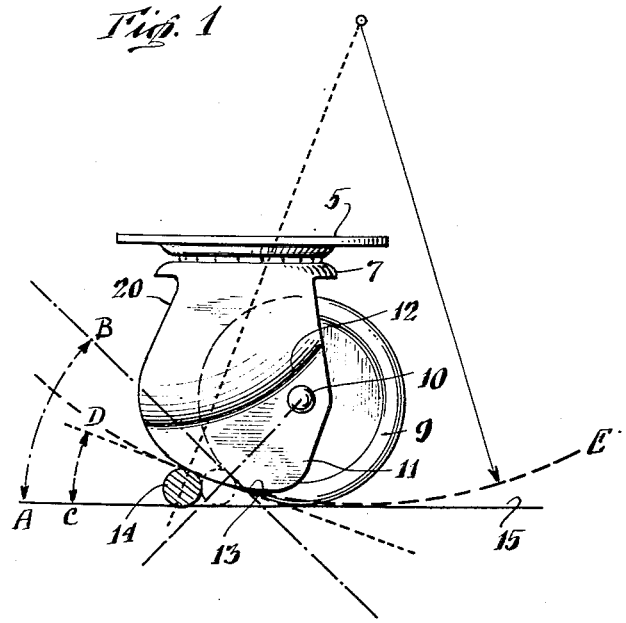
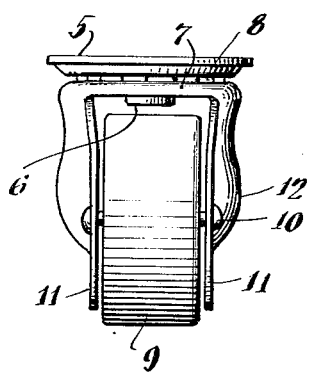
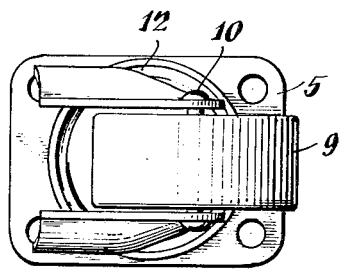
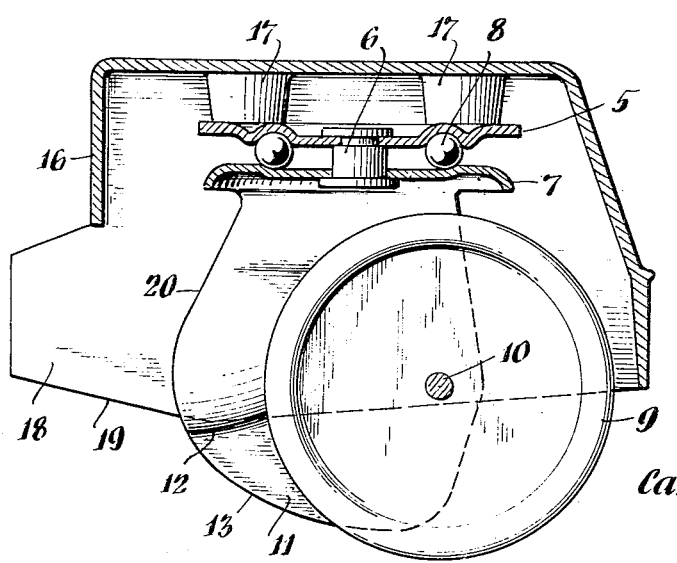
INVENTOR
Carl E. Meyerhoefer
BY Kane, Dalsimer and Kane
ATTORNEYS

United States Patent Office 2,810,925
Patented Oct. 29, 1957

2,810,925
CASTER

Carl E. Meyerhoefer, Brooklyn, N. Y., assignor to Lewyt Corporation, Brooklyn, N. Y., a corporation of New York Original application November 24, 1954, Serial No. 470,930. Divided and this application January 10, 1955, Serial No. 480,879

2 Claims. (Cl. 16—18)

This invention relates to a structurally and functionally improved caster, the present application being a division of my prior application for United States Letters Patent entitled "Vacuum Cleaner Assembly and Caddy," Serial No. 470,930, filed on November 24, 1954.

By means of the present teachings a carrier assembly is provided which will readily traverse articles disposed upon a supporting surface. Accordingly, these articles will not become entangled with the assembly. Rather a caster will override the article and continue to support the unit with which it is associated.

A further object is that of furnishing an assembly which will present a minimum of resistance to traversing an article or other obstruction upon a supporting surface and in which there will be substantially no danger of that article becoming entangled within the assembly.

Still another object is that of providing a unit of this type which will include relatively few parts each individually simple and rugged in construction and capable of economical manufacture by quantity production methods; that article serving over long periods of time with freedom from all difficulties.

With these and other objects in mind reference is had to the attached sheet of drawing illustrating one practical embodiment of the invention and in which:

Figure 1 is a side elevation of the caster assembly;

Figure 2 is a front view thereof;

Figure 3 is a bottom plan view of the same; and

Figure 4 is a sectional side view of an entire assembly in enlarged scale.

The present caster may be associated with various units to be supported. So associated it will not entangle with an article loosely placed on the floor. Also, it will permit of the caster assembly readily traversing that article with minimum effort being exerted to effect such traversal. The caster is ideally adapted for the support of a vacuum cleaner and parts associated therewith as covered in the application for patent of which the present is a division. However, as afore brought out it may be used to advantage in numerous other associations.

Thus, in these views the numeral 5 indicates a plate which is attached by a pivot or swivel member 6 to a second plate 7. Both of these plates have their inner faces spaced from each other to define complementary annular channels. Within the latter a series of antifriction elements, such as balls 8, may be disposed. In this manner the plates 5 and 7 serve as race members of a ball bearing assembly.

Plate 7 supports a wheel 9 which has its periphery preferably formed of rubber and has its axis defined by a shaft 10. The ends of the latter are secured one to each of a pair of supporting and guiding wings or plates 11. These portions are preferably integral with plate 7. If desired and for use in manufacture, bulged zones 12 may be included in each of the guiding portions 11. These wings provide an enclosure for the forward portion of wheel 9.

The latter is journaled at a point in these portions such that its periphery extends below the lower edges of these wings.

The forward edges of the plates 11 are curved beginning with a plane substantially in line with shaft 10 in a downward and rearward direction to define an edge 13. Especially at a point immediately adjacent the point at which the periphery of the wheel extends below the plates this edge defines a camming surface. That surface is preferably curved. The degree of curvature is such that an arc is defined which is a segment of a circle having a far greater radius than the circle defined by wheel 9.

Referring primarily to Figure 1, it will be assumed that the diameter of wheel 9 may be 1⅝". In that view an obstruction has been indicated at 14 upon a supporting surface 15. That obstruction may be a cord, the diameter of which is greater than the distance spacing the effective lower edge portion 13 of the plate from the supporting surface. As has been indicated in this figure, the normal angle of attack by the wheel as defined between points A and B would be approximately 44°. However, the degree of curvature of the edge portion 13 which contacts the obstruction 14 is defined between points C and D. That angle would be only 20°. Continuing this edge curvature of the guiding portion 13 an arc E is defined which is a segment of a circle having a diameter of 7½". It therefore follows that if no guiding portions provided by the plates 11 or their equivalents were present the article 14 would present an obstruction to wheel 9 such that the latter would cease to rotate and simply push or "skid" the article over surface 15.

Under those circumstances the unit supported by the caster would offer greatly increased resistance to movement. This is aside from the fact that article 14 would be liable to become damaged and would also entangle itself in the assembly. However, due to the provision of the guiding portions as defined by the edges 13 an angle of attack far less obtuse is presented. Therefore, the article remains substantially stationary on surface 15 and is in fact pressed intimately against that surface. Also the entire caster assembly will be lifted by camming action in an upward direction. Therefore the periphery of wheel 9 may readily pass over or traverse the article 14 which will thus remain substantially in the position which it occupied when the caster assembly encountered it.

As shown particularly in Figure 4 the assembly thus provided may be included in a complete assembly which can include a housing member 16 having its inner face provided with supports 17 which secure the upper plate 5 against movement. This housing may also be provided with a forward portion 18 having a downwardly and rearwardly inclined edge 19 which extends into a plane below the foremost point of the plates 11 and forms a fender for the wheel. These plates in a plane substantially beginning with that of the axle 10 may be curved upwardly and extend rearwardly as indicated at 20.

With such a further guiding structure present it is apparent that an article 14 will not tend to ride upwardly. In other words if it lies loosely upon floor 15 and has portions extending above that floor these portions will not tend to override along surfaces 20 to become entangled in the caster assembly. Rather they will be diverted by edges 19 in a downward direction to where they are engaged by edges 13. Thereupon a coaction of the parts occurs as previously described.

Thus, among others, the several objects of the invention as specifically aforenoted are achieved. Obviously, numerous changes in construction and rearrangements of the parts might be resorted to without departing from the spirit of the invention as defined by the claims.

What is claimed is:

1. A caster assembly including in combination a fixed housing; a swivel member extending vertically downward from said housing; a support member connected to the lower end of said swivel member; a horizontal axle member attached to said support member; a wheel mounted on said axle member; an edge of said housing forming a fender for said wheel and presenting a surface inclined upwardly at an angle in advance of said wheel, said incline having its uppermost portion furthest from said wheel; a guide surface forming a part of said support member and including a downwardly inclined edge portion extending adjacent and in advance of that part of the wheel periphery about to contact a supporting surface.

2. A caster assembly including in combination a fixed housing; a swivel member extending vertically downward from said housing; a support member connected to the lower end of said swivel member; a horizontal axle member attached to said support member; a wheel mounted on said axle member; an edge of said housing forming a fender for said wheel and presenting a surface inclined upwardly at an angle in advance of said wheel, said incline having its uppermost portion furthest from said wheel; a guide surface forming a part of said support member and including a downwardly inclined edge portion extending adjacent and in advance of that part of the wheel periphery about to contact a supporting surface and said edge portion being curved along an arc forming a part of a circle of substantially greater radius than the radius of said wheel.

References Cited in the file of this patent
UNITED STATES PATENTS

| | | |
|---|---|---|
| 288,633 | Hasenpflug | Nov. 20, 1883 |
| 1,012,404 | Means | Dec. 19, 1911 |
| 1,642,712 | Angers | Sept. 20, 1927 |